A. Eckstein,
Evaporator.

No. 95,445. Patented Oct. 5, 1869.

Witnesses.
Emanuel Nussbaum
v. Nathan

Inventor.
Albert Eckstein

United States Patent Office.

ALBERT ECKSTEIN, OF VIENNA, AUSTRIA, ASSIGNOR TO "ZDENKS RITTER VON WESSELY," OF SAME PLACE.

*Letters Patent No. 95,445, dated October 5, 1869.*

IMPROVED APPARATUS FOR EVAPORATING AND DECOMPOSING LIQUIDS.

The Schedule referred to in these Letters Patent and making part of the same.

*To all whom it may concern:*

Be it known that I, ALBERT ECKSTEIN, of the city of Vienna, in the Empire of Austria, have made certain new and useful Improvements in Apparatus for Evaporating and Decomposing Liquids, for which improvements I have obtained Letters Patent in the Empire of Austria, granted to me November 29, 1868, and which are numbered 22,406 and 3,963, and I do hereby declare that the following is a clear and exact description of the same, reference being had to the annexed drawings, and letters of reference marked thereon, they making part of the same.

The object of this improvement is to furnish better means for promoting evaporation of strongly-saturated liquids, and to provide for more equal distribution of heat among its particles, and to prevent the overheating of any portions of the same, than with those heretofore known.

The nature of this invention consists in the employment, in evaporating-vessels, of a conical rarefying-tube, covering with its base, and resting upon the bottom of the evaporating-vessel, to contract the heat therein, and cause speedy elevation of the foam through it; and in the employment of a conical, slanting downward, distributing-table, leading from the top of the rarefying-tube, upon which table the said foam is distributed and decomposed, and the liquid portion caused to descend to the bottom of the evaporating-vessel, so that by these means the liquid is caused to interchange its particles constantly with the bottom, or more intensely-heated portion of the evaporating-vessel, and that its foam is caused to a speedy decomposition, and delivery of the light gravity vapors, whereby the evaporation of such liquids is, greatly promoted, and the liquid less liable to injury, and becoming overheated and burned by the use of intense heat.

To enable others to make and use my invention, I will proceed to describe its construction and operation.

In the drawings—

Figure 6:
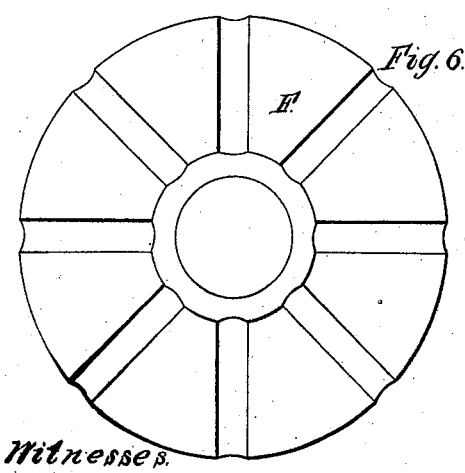
Figure 7:
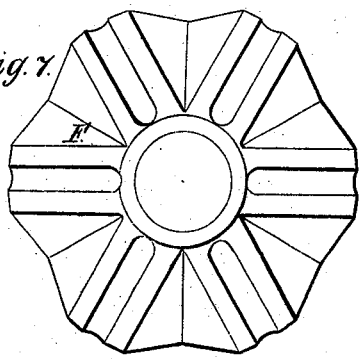

Figures 6 and 7 plan views of the same.

Figure 9:
Figures 4, 5:
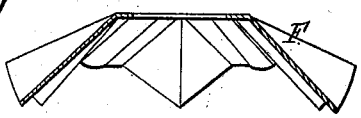
Figures 4 and 5 are vertical sections of modifications of the distributing-tables of the same.
Figure 8:

Figures 8 and 9 are modifications of the crown-part of the conical rarefying-tube, shown in red outline.

Similar letters of reference indicate corresponding parts in the several figures.

A represents an ordinary evaporating-vessel, which may be a closed vessel, for evaporating in rarefied or in condensed space, or it may be to evaporate in common atmosphere.

Upon the bottom, B, of this vessel, I place a conical or rarefying-tube, C, the base of which is made flaring, and nearly spreads over the whole surface of the bottom of the vessel.

The top end D of this tube C is made considerably smaller than its base. For ordinary use, it is sufficiently large if one-fourth of that of the base, but may be smaller or larger, in accordance with the liquid operated upon.

Near the top end D, I provide the said tube with a shoulder, E, and upon it I employ a circumferential, downwardly-descending table, F, which spreads equally toward the side of the vessel.

In order to admit free communication of the liquid from between the side of the tube C and vessel, I have, on the bottom end of the tube C, proper openings G G; and to interpose and divide the passage of the foam through the top of the tube C, I provide a screen-partition, H, across the top opening of said tube; and I make, for the better separation of the foam, the top of the said tube with a toothed or zig-zag edge, as shown. And opposite the top of the distributing-plate, I provide the tube C with small escape-openings I I I I.

Figure 1:
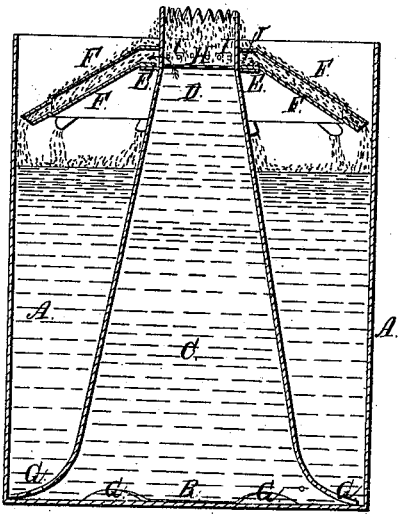
Figure 1 represents a vertical central section of an evaporating-vessel, in colored outlines, with my improved devices, shown in black lines, employed thereto.
Figure 2:
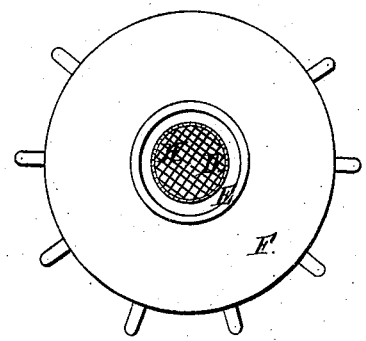
Figure 2 is a top view of the same.
Figure 3:
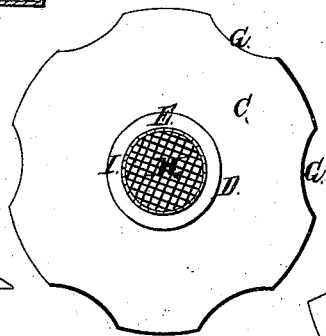
Figure 3 is a detached top view of the conical rarefying-tube.

The distributing-table may be made of the form shown in fig. 1, with a smooth surface on its top side, or may be made with grooves of different inclination or depth, as shown in figs. 4, 5, 6, and 7, or two or more of these tables may be employed upon one another, with a space between, and the discharge from them conducted through a series of small tubes distributed on their periphery, as shown in fig. 1; and the said table may be fixed permanently, or may be hinged, or simply resting with its weight upon the tube C, as the case may be, and in accordance with the liquid operated upon.

The top edge of the mouth of the tube C may be with its prongs extending vertically, or these prongs may be bent outward, as shown in fig. 8, or inward, as shown in fig. 9.

The tube C and table F may be made of metal, earthenware, or other suitable material, according to the liquid operated upon.

From the foregoing, it will be perceived that, by means of the devices described, the liquid operated upon is caused to a constant mingling of its particles, and to interchange of contact with the more extensively-heated parts of the evaporating-vessel, the foam produced under the rarefied space in the tube C is caused to elevate, and in discharging and spreading over the table F, speedily liberates the vapors contained in the liquid, so that by these means the evacoration of the liquid is greatly promoted, and the liquid may be highly concentrated with facility, and with much less danger of injuring the same than with the means heretofore known.

Having fully described my invention,

What I claim therein, and desire to secure by Letters Patent, is—

In apparatus for evaporating and concentrating liquids of the means described, substantially as and for the purpose herein shown.

ALBERT ECKSTEIN.

Witnesses:
EMANUEL NUSSBAUM,
V. NATHAN.